(No Model.)

J. H. PETERSON.
BRAKE FOR CHILDREN'S CARRIAGES.

No. 374,001. Patented Nov. 29, 1887.

WITNESSES:
N. R. Davis
C. Sedgwick

INVENTOR:
J. H. Peterson
BY Munn & Co.
ATTORNEYS.

UNITED STATES PATENT OFFICE.

JAMES H. PETERSON, OF BROOKLYN, NEW YORK.

BRAKE FOR CHILDREN'S CARRIAGES.

SPECIFICATION forming part of Letters Patent No. 374,001, dated November 29, 1887.

Application filed June 18, 1887. Serial No. 241,748. (No model.)

*To all whom it may concern:*

Be it known that I, JAMES H. PETERSON, of Brooklyn, in the county of Kings and State of New York, have invented a new and useful Improvement in Brakes for Children's Carriages, of which the following is a full, clear, and exact description.

My invention relates to an improvement in brakes for children's carriages, and has for its object to provide a brake quickly and readily applied from the handle, and a convenient means of locking said brake, whereby a carriage may be left upon an inclined surface without danger of its changing position.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1:
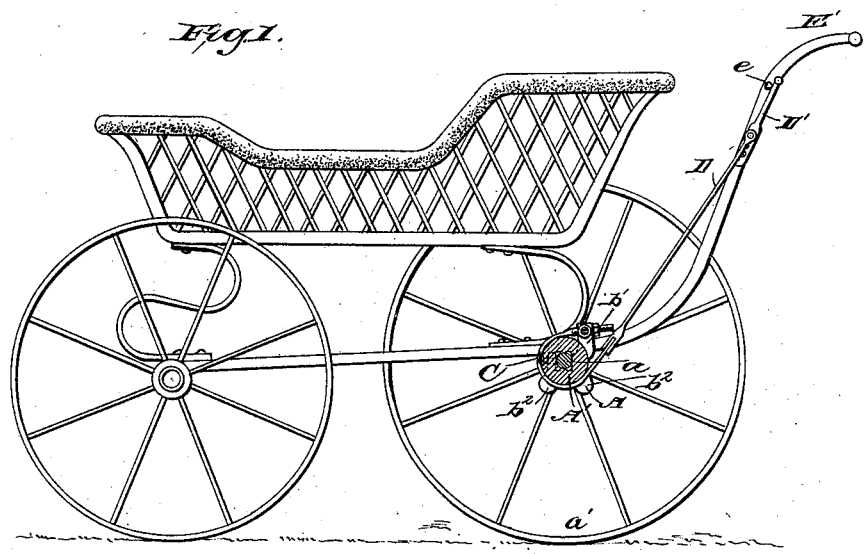
Figure 2:
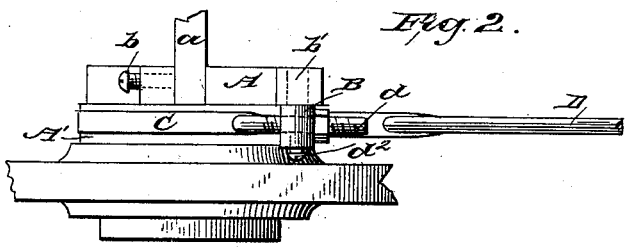

Figure 1 is a side elevation of a carriage having my improvement applied, the hind axle being in transverse section. Fig. 2 is a plan view of the brake proper applied to the hub of a wheel, and Fig. 3 is a side elevation of the same.

Figure 3:
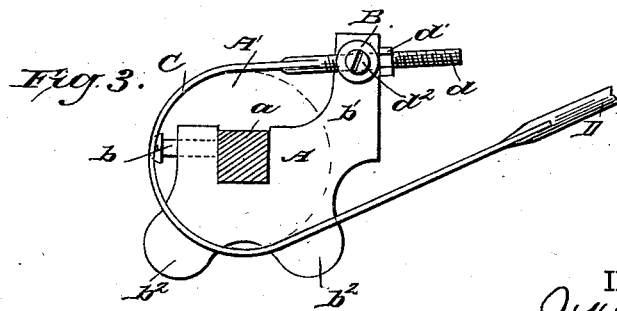

In carrying out the invention a bracket, A, is attached to the axle $a$ in substantial contact with the hub A' of the wheel $a'$, the said bracket being attached to the axle by a set-screw, $b$, or other approved means, and provided with an upwardly-extending lug, $b'$, integral with the upper inner edge, and downwardly-extending lugs $b^2$, integral with the lower edge, as shown in Fig. 3.

A post, B, is secured in the outer face of the lug $b'$, apertured diametrically and centrally through the body at the side, and also at right angles to said side apertures at the outer end.

One end of a strap, C, made preferably of spring metal, is passed through the side apertures in the post B, which end is provided with a threaded surface, $d$, and a nut, $d'$, entered thereon to a bearing against said post. In the end aperture of the post a set-screw, $d^2$, is entered, adapted to be screwed down to a bearing upon the threaded end of the strap, as shown in Fig. 3. The strap C is now carried outward around the hub A' of the wheel, the contact-surface of the said strap being preferably flat, and upward to a connection with a rod, D, the upper end of the rod being pivotally secured to a hand-lever, D', centrally near one end thereof, and the said lever D is pivotally secured to the side of the carriage-handle, as shown in Fig. 1.

The pivotal connection of the hand-lever to the carriage-handle is effected below the central axis at the end to which the rod D is attached, and upon the side rail of the carriage-handle, to which the aforesaid lever D' is pivoted, a pin, $e$, is secured in such position that when the lever is drawn up to apply the brake it will, when the brake is applied, come in contact with said pin and its upward motion be thereby limited.

In operation, as the lever D' is carried downward, and as it passes the dead-center, the tension of the strap is brought to bear upon it, and it is thereby automatically thrown completely down and the brake taken off. The same is true when the lever is carried upward to apply the brake. The pin, however, prevents it in this case, when carried past the dead-center, from acting under the tension of the strap holding the said lever D' at a point where it will bring the spring-strap under the greatest tension.

It is evident that the point of adjustment for the strap may be at the attachment with the handle, or that the rod D may be divided and a turn-buckle be employed to connect it, and also that the strap and rod may be one piece, and the contact-surface of the strap with the hub be either flat or round, as found in practice most desirable.

I do not confine myself to the attachment of the bracket to the axle, as the construction of some carriages will not admit it. In such cases the bracket may be attached to the handle near the axle, or to any suitable projection or brace in close proximity to said axle.

Having thus described my invention, what I claim as new, and desire to secure by Letters Patent, is—

1. The combination, with the axle and hub of one wheel of a child's carriage, of a bracket adapted for attachment to the axle, apertured to receive one end of a brake-strap and provided with a set-screw entering said aperture, a brake-strap adapted to encircle said hub and provided with a threaded end and nut, a lock-lever pivoted on the carriage-handle, and connections between said brake-strap and lever, substantially as and for the purpose herein set forth.

2. The bracket A, constructed with a recess for attachment to the axle and with a projecting lug to receive the extremity of the brake-strap, as set forth.

3. In children's carriages, the combination, with the hub A', the axle, and handle, of bracket A, strap C, rod D, link D', and stop e, operated as herein set forth.

4. The combination, with the axle a and wheel-hub A', of the bracket A, apertured to receive one end of the brake-strap and provided with the set-screw $d^2$, the brake-strap C, having one end screw-threaded, the nut $d'$, the lever D', pivoted on the carriage-handle, the rod D, connected with the brake-strap and pivoted to the lever D', and the stop-pin e, all adapted to operate in the manner and for the purpose herein set forth.

5. In a brake for children's carriages, the combination, with the axle and hub of the wheel, of a brake-strap adjustably connected to the axle and adapted to encircle the hub, a lever pivoted to the outer face of the carriage-handle, a rod connected to the brake-strap and pivoted to the lever above its fulcrum, and a stop-pin on the handle, located beyond the center of the line of draft of said connecting-rod, substantially as herein shown and described.

JAMES H. PETERSON.

Witnesses:
J. F. ACKER, Jr.,
EDGAR TATE.